United States Patent
Jang et al.

(10) Patent No.: US 12,407,801 B2
(45) Date of Patent: Sep. 2, 2025

(54) IMAGE PROCESSING APPARATUS PERFORMING COLOR CONVERSION AND METHOD FOR IMAGE PROCESSING

(71) Applicant: SAMSUNG ELECTRONICS CO., LTD., Suwon-si (KR)

(72) Inventors: Chanyoung Jang, Pohang-si (KR); Hee Kang, Hwaseong-si (KR); Jongmin You, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 534 days.

(21) Appl. No.: 17/864,835

(22) Filed: Jul. 14, 2022

(65) Prior Publication Data
US 2023/0033857 A1 Feb. 2, 2023

(30) Foreign Application Priority Data
Jul. 27, 2021 (KR) .................. 10-2021-0098681

(51) Int. Cl.
  *H04N 9/73* (2023.01)
  *G06T 3/4015* (2024.01)
  *G06T 5/50* (2006.01)

(52) U.S. Cl.
  CPC ............ *H04N 9/73* (2013.01); *G06T 3/4015* (2013.01); *G06T 5/50* (2013.01); *G06T 2207/10024* (2013.01)

(58) Field of Classification Search
  CPC ........... H04N 9/73; G06T 3/4015; G06T 5/50; G06T 2207/10024
  See application file for complete search history.

(56) References Cited

U.S. PATENT DOCUMENTS

| | | |
|---|---|---|
| 6,690,418 B1 | 2/2004 | Terasawa et al. |
| 6,853,748 B2 | 2/2005 | Endo et al. |
| 6,975,733 B1 | 12/2005 | Choi et al. |
| 7,082,218 B2 * | 7/2006 | Pollard ............... H04N 25/134 |
| | | 382/167 |
| 7,239,744 B2 | 7/2007 | Arazaki |
| 7,916,189 B2 * | 3/2011 | Ikeda .................... H04N 1/409 |
| | | 348/241 |
| 8,115,834 B2 | 2/2012 | Suzuki |
| 8,704,911 B2 | 4/2014 | Shimizu |
| 8,792,712 B2 | 7/2014 | Han |
| 10,498,988 B2 | 12/2019 | Park et al. |
| 10,553,144 B2 * | 2/2020 | Tsuchida .............. G09G 3/3233 |
| 2003/0151693 A1 * | 8/2003 | Honda ..................... H04N 9/77 |
| | | 348/631 |
| 2005/0286798 A1 * | 12/2005 | Pollard .................... G06T 5/75 |
| | | 386/E9.006 |

(Continued)

FOREIGN PATENT DOCUMENTS

JP          2009141694 A      6/2009

*Primary Examiner* — Utpal D Shah
(74) *Attorney, Agent, or Firm* — Sughrue Mion, PLLC

(57) ABSTRACT

An image processing method for converting a color space of input image data including color information is provided. The image processing method includes: preprocessing the input image data according to a frequency thereof to generate a preprocessed result; and color-converting the preprocessed result to generate output image data. The color space of the input image data is different from a color space of the output image data.

20 Claims, 14 Drawing Sheets

(56) References Cited

U.S. PATENT DOCUMENTS

| | | | |
|---|---|---|---|
| 2006/0104507 A1* | 5/2006 | John | H04N 1/58 |
| | | | 382/167 |
| 2010/0026856 A1* | 2/2010 | Jang | H04N 21/4223 |
| | | | 348/241 |
| 2017/0251901 A1* | 9/2017 | Miyai | A61B 1/0661 |
| 2020/0007734 A1* | 1/2020 | Kagawa | G06T 7/11 |
| 2020/0275065 A1* | 8/2020 | Murasawa | H04N 9/646 |

* cited by examiner

OPD (RGB)

IMAGE PROCESSING APPARATUS PERFORMING COLOR CONVERSION AND METHOD FOR IMAGE PROCESSING

CROSS-REFERENCE TO RELATED APPLICATION

This application is based on and claims priority to Korean Patent Application No. 10-2021-0098681, filed on Jul. 27, 2021, in the Korean Intellectual Property Office, the disclosure of which is incorporated by reference herein in its entirety.

BACKGROUND

The present disclosure relates to an image processing apparatus and a method for image processing, and more particularly, to an image processing apparatus and image processing method for color-converting image data.

Image processors provided in electronic devices, such as cameras or smartphones, may perform an image processing operation. For example, the image processors may change a data format of image data generated by an image sensor into a data format such as RGB or YUV, remove noise from image data, adjust brightness, etc. Recently, as demand for high-quality and high-definition pictures and images increases, a lot of overhead is applied to image processors, thereby degrading quality of pictures and images.

SUMMARY

One or more example embodiments provide an image processing apparatus and an image processing method for performing color conversion to reduce noise. Additional aspects will be set forth in part in the description which follows and, in part, will be apparent from the description, or may be learned by practice of the presented embodiments.

According to an aspect of an example embodiment, an image processing method for converting a color space of input image data including color information is provided. The image processing method includes: preprocessing the input image data according to a frequency thereof to generate a preprocessed result; and color-converting the preprocessed result to generate output image data. The color space of the input image data is different from a color space of the output image data.

According to an aspect of an example embodiment, an image processing method includes: separating input image data into high-frequency component data and low-frequency component data, the input image data comprising color information; generating first correction data by color-converting the low-frequency component data using a color conversion matrix; generating second correction data by adjusting a data value of the high-frequency component data using the first correction data; summing the first correction data with the second correction data to generate sum data; and generating first image data by performing color inverse conversion on the sum data using a color inverse conversion matrix.

According to an aspect of an example embodiment, an image processing apparatus for converting input image data including color information is provided. The image processing apparatus includes: one or more memories storing instructions; and one or more processors configured to execute the instructions to control: a data component separation module to generate high-frequency component data and low-frequency component data based on the input image data; a first color conversion module to color-convert the low-frequency component data using a color conversion matrix to generate first correction data; a data transmission module to generate second correction data based on the input image data, the high-frequency component data, and the first correction data; and a color inverse conversion module to perform color inverse conversion on sum data obtained by summing the first correction data with the second correction data using an inverse matrix of the color conversion matrix, to generate first image data.

BRIEF DESCRIPTION OF THE DRAWINGS

The above and other aspects, features, and advantages will be more clearly understood from the following detailed description, taken in conjunction with the accompanying drawings, in which.

DETAILED DESCRIPTION

Hereinafter, example embodiments are described in detail with reference to the accompanying drawings.

Figure 1A:
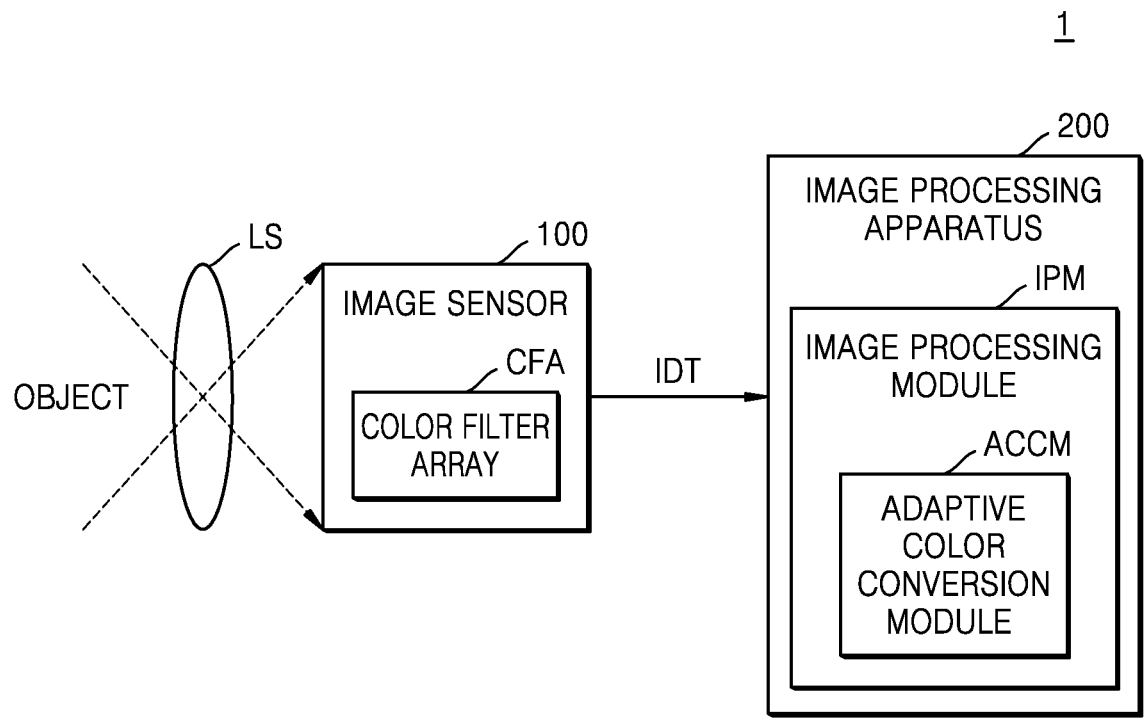
FIGS. 1A and 1B are block diagrams illustrating an image processing system according to example embodiments.
Figure 1B:
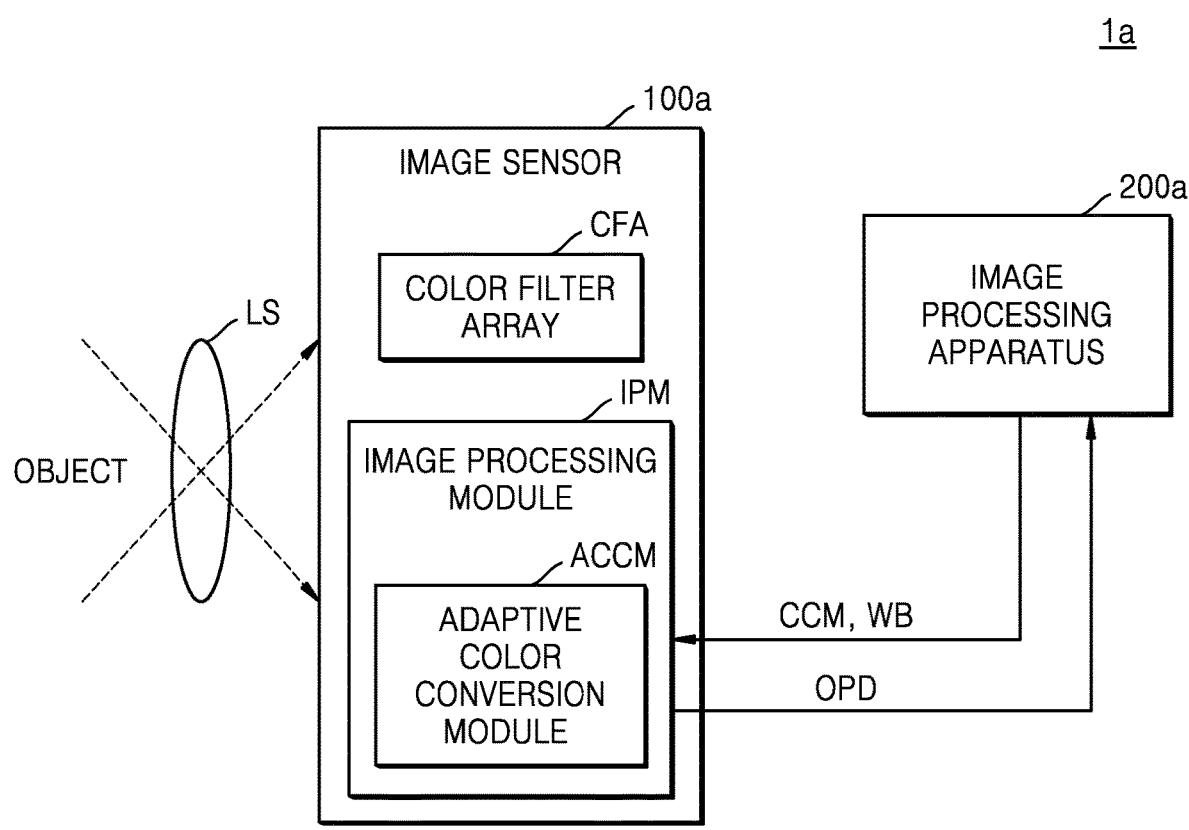
Figure 2:
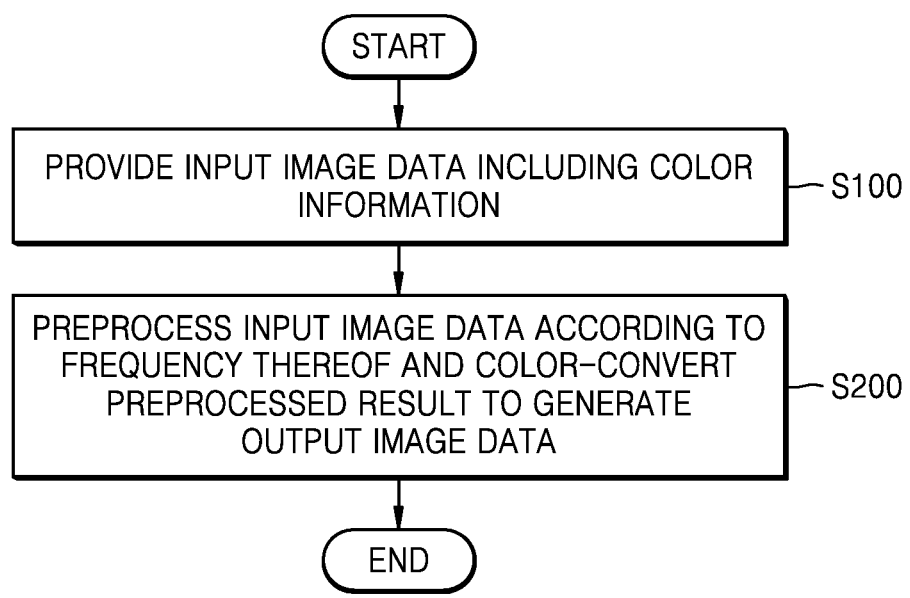
FIG. 2 is a flowchart illustrating an image processing method according to an example embodiment.

FIGS. 1A and 1B are block diagrams illustrating image processing systems 1 and 1a, respectively, according to example embodiments. FIG. 2 is a flowchart illustrating an image processing method according to an example embodiment.

The image processing systems 1 and 1a may be implemented as electronic devices which capture an image, display the captured image, or perform an operation based on the captured image. The image processing systems 1 and 1a may be implemented as, for example, personal computers (PCs), Internet of Things (IoT) devices, or portable electronic devices. The portable electronic devices may include laptop computers, mobile phones, smartphones, tablet PCs, personal digital assistants (PDAs), enterprise digital assistants (EDAs), digital still cameras, digital video cameras, audio devices, portable multimedia players (PMPs), personal navigation devices (PNDs), MP3 players, handheld game consoles, e-books, wearable devices, etc. In addition, the image processing systems 1 and 1a may be mounted in electronic devices such as drones, advanced driver assistance systems (ADAS), etc., or electronic devices provided as components of vehicles, furniture, manufacturing facilities, doors, various measurement devices, etc.

Referring to FIG. 1A, the image processing system 1 may include an image sensor 100 and an image processing apparatus 200. The image processing system 1 may further include other components such as a display, a user interface, and the like. The image processing apparatus 200 or the image processing system 1 may be implemented as a system on chip (SoC). In an example embodiment, the image processing apparatus 200 may be an application processor.

The image sensor 100 may convert an optical signal reflected from an object through an optical lens LS into an electrical signals, and generate and output image data IDT based on the electrical signals. The image sensor 100 may include a color filter array CFA having a certain pattern, and convert the optical signal into an electrical signal using the color filter array CFA. The color filter array CFA may include any one or any combination of a green color filter, a red color filter, a blue color filter, a white color filter, a yellow color filter, a cyan color filter, and a magenta color filter. Accordingly, the image data IDT may include color information.

An image processing module IPM of the image processing apparatus 200 may perform image signal processing, such as crosstalk correction, despeckle operation, auto dark level compensation (ADLC), bad pixel correction, lens shading correction, gamma correction, color filter array interpolation, color correction, color enhancement, etc., on the image data IDT to reduce noise and improve image quality. In addition, the image processing module IPM may compress the processed image data to generate an image file, or may restore image data from the image file. Configuration of the image processing module IPM and modules described below may be implemented as a software block executed by a certain processor (e.g., a hardware processor) or a combination of a dedicated hardware block and a processing unit.

The image processing module IPM may include an adaptive color conversion module ACCM to convert a color space of the input image data performing white balancing. As the adaptive color conversion module ACCM operates, the image processing apparatus 200 may perform the operations of FIG. 2.

Referring to FIG. 1B, the image processing system 1a may include an image sensor 100a and an image processing apparatus 200a, and an image processing module IPM may be provided in the image sensor 100a. For example, the image processing module IPM may be included in a signal processing unit (e.g., 130 of FIG. 11) of the image sensor 100a.

An adaptive color conversion module ACCM of the image sensor 100a may convert a color space of input image data generated by the image sensor 100a or perform a white balance correction operation. The adaptive color conversion module ACCM of the image sensor 100a may receive a color conversion matrix CCM and a white balance matrix WB from the image processing apparatus 200a, and an adaptive color conversion module ACCM of the image sensor 100a may convert input image data into output image data OPD using a color conversion matrix CCM and a white balance matrix WB. Here, the color conversion matrix CCM and the white balance matrix WB may be previously stored in the image processing apparatus 200a.

However, example embodiments are not limited thereto and the adaptive color conversion module ACCM of the image sensor 100a may receive, from the image processing apparatus 200a, spectral information having a structure of a color conversion function based on a wavelength of a color, rather than the color conversion matrix CCM or may perform color conversion processing using the spectral information. For example, the adaptive color conversion module ACCM of the image sensor 100a may extract a color conversion matrix CCM from the spectral information.

As the adaptive color conversion module ACCM operates, the image sensor 100a may perform the operations of FIG. 2.

Referring to FIGS. 1A, 1B, and 2, in operation S100, input image data including color information may be provided (e.g., input). The input image data may be image data IDT generated by the image sensor 100 or 100a or may be data that is corrected after the image data IDT is received by the image processing apparatus 200 or 200a. Color information included in the input image data is described in detail with reference to FIG. 7.

In operation S200, the input image data may be preprocessed according to a frequency of the input image data, and a preprocessed image data result may be color-converted to generate output image data. For example, the input image data may be divided into low-frequency component data including a smooth image and high-frequency component data including a detail image according to a frequency, and different preprocessing operations may be performed on the low-frequency component data and the high-frequency component data, respectively. The image processing apparatus 200 or 200a may perform a color conversion preprocessing operation to adjust a data value of the high-frequency component data and then perform a color conversion operation on the preprocessed data. Therefore, by color-converting the high-frequency component data of the input image data, noise included in the high-frequency component data may be prevented from being amplified.

Figure 3:
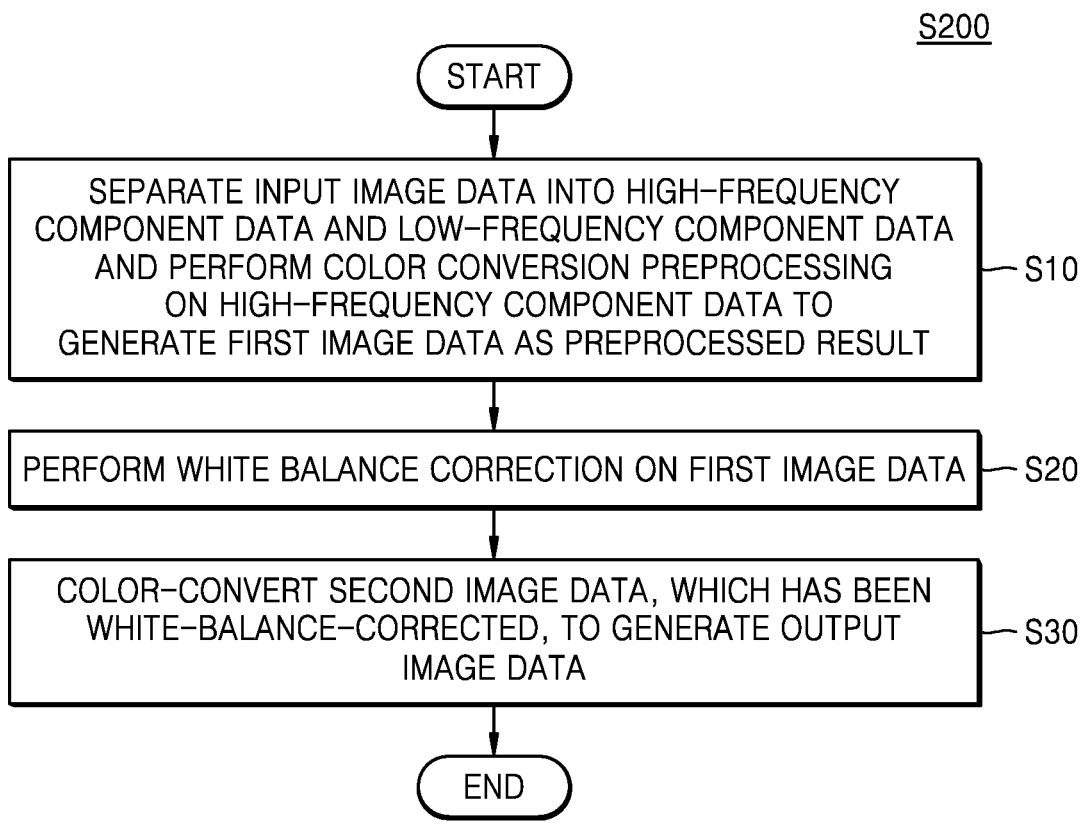
FIG. 3 is a flowchart illustrating an image processing method according to an example embodiment.
Figure 4:
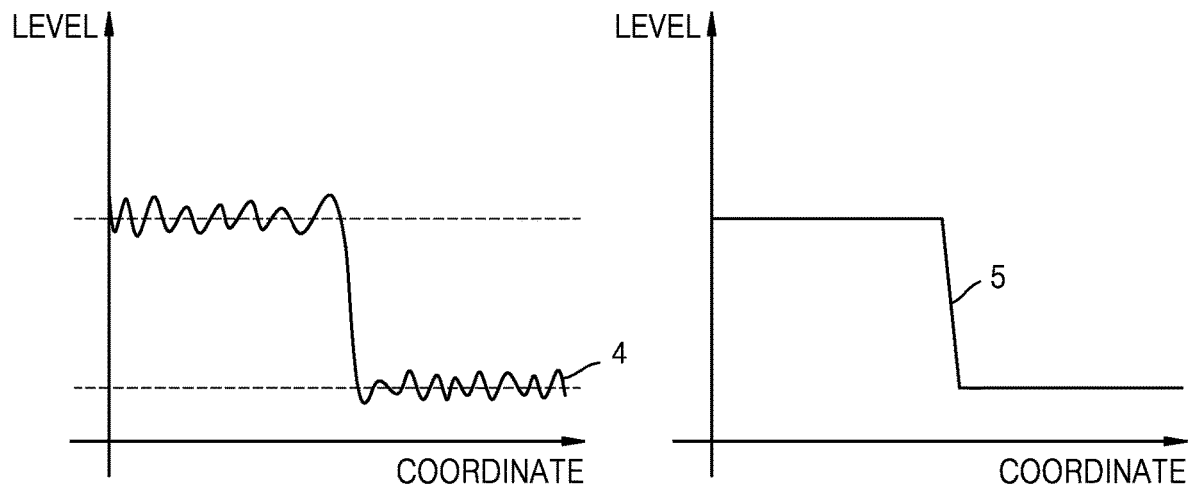
FIG. 4 is a diagram illustrating components of input image data according to example embodiments.

FIG. 3 is a flowchart illustrating an image processing method according to an example embodiment, and is an example of operation S200 of FIG. 2. FIG. 4 is a diagram illustrating components of input image data according to example embodiments. The operations described below may be performed by the adaptive color conversion module ACCM of FIGS. 1A and 1B. Operation S200 may include operations S10 to S30.

Referring to FIG. 3, in operation S10, the input image data may be separated into high-frequency component data and low-frequency component data, and the high-frequency component data may be color-conversion-preprocessed to generate first image data as a preprocessing result. A data value of the high-frequency component data may be adjusted according to the preprocessing operation. A detailed operation of S10 is described below with reference to FIG. 5.

Referring to FIG. 4, the horizontal axis may represent a horizontal position of data, and the vertical axis may represent a data value. Curve 4 may represent input image data including both high-frequency component data and low-frequency component data, and curve 5 may represent low-frequency component data. The low-frequency component data may be smooth image data, and the high-frequency component data may be detail image data and may include noise. The low-frequency component data may be extracted through, for example, a binning operation on the input image data, and the high-frequency component data may be extracted by removing the low-frequency image data from the input image data.

Referring back to FIG. 3, in operation S20, the first image data as the preprocessing result may be white-balance-corrected. A white balance matrix for a white balance correction operation may be previously set, and white balance-corrected second image data may be generated by performing a matrix operation on the first image data with the white balance matrix.

In operation S30, the white balance-corrected second image data may be color-converted to generate output image data. A color conversion matrix for a color conversion operation may be previously set, and output image data may be generated by performing a matrix operation on the second image data with the color conversion matrix.

However, example embodiments are not limited thereto and, for example, a color may be converted using spectral information having a structure of a color conversion function according to a wavelength of a color, rather than the color conversion matrix.

Also, in example embodiments, in contrast to the method shown in FIG. 3, the white balance correction operation S20 may be omitted, may be performed after operation S30 or may be performed before operation S10.

If the high-frequency component data is color-converted without the color conversion preprocessing operation, noise included in the high-frequency component data may be boosted according to coefficients of the color conversion matrix or coefficients of the white balance matrix. In particular, when correlation between color information included in the input image data is high (e.g., in the case of input image data having a color pattern such as CMY or CMYG), the probability in which noise is boosted by the coefficients of the color conversion matrix may be high. The image processing method according to example embodiments may prevent noise of the high-frequency component data from being boosted by the color conversion matrix, by performing the color conversion preprocessing operation before the color conversion operation to adjust the data value of the high-frequency component data in advance.

Figure 5:
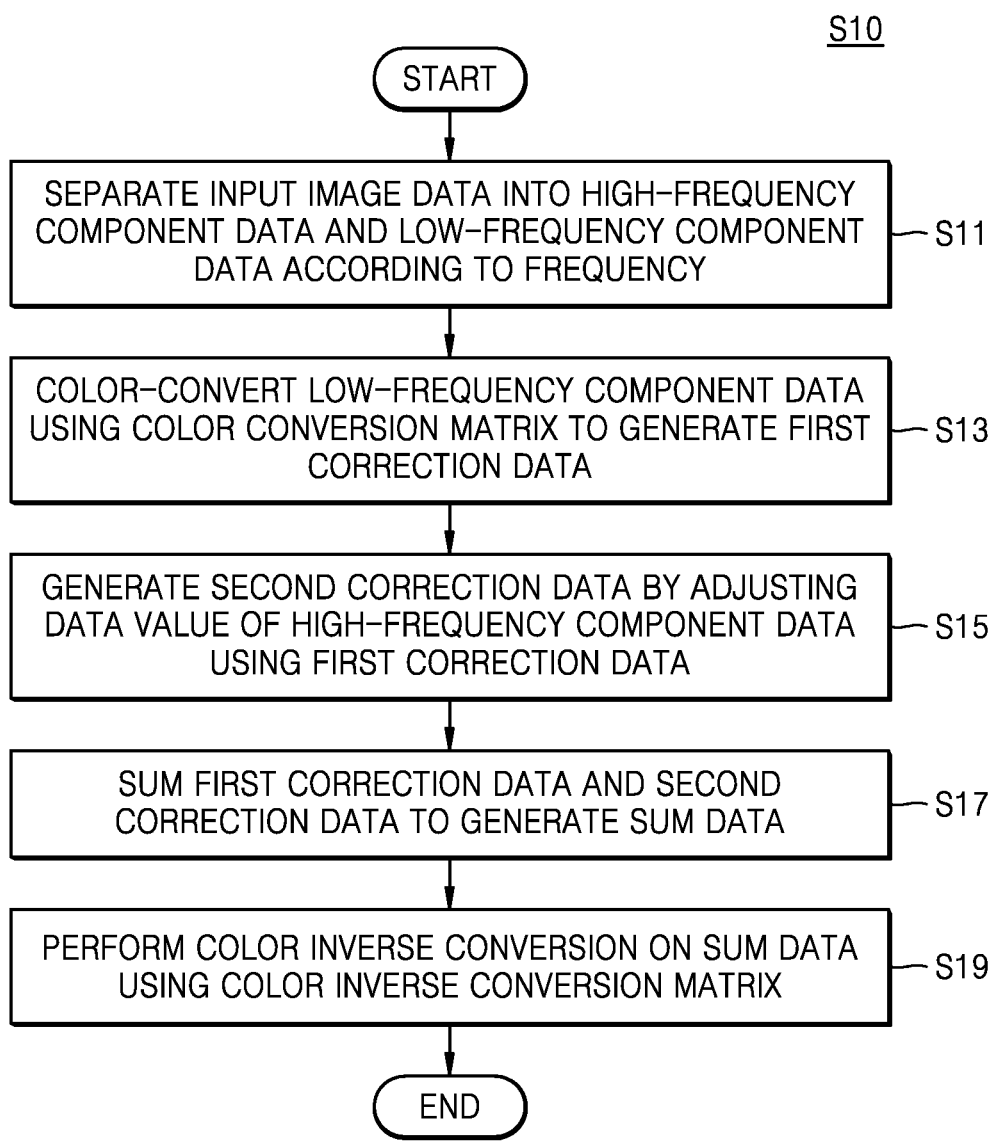
FIG. 5 is a flowchart illustrating an image processing method according to an example embodiment.

FIG. 5 is a flowchart illustrating an image processing method according to an example embodiment, and is an example of operation S10 of FIG. 3. The operations described below may be performed by the adaptive color conversion module ACCM of FIGS. 1A and 1B. Operation S10 may include operations S11 to S19.

Referring to FIG. 5, in operation S11, input image data may be divided into high-frequency component data and low-frequency component data according to frequencies. For example, the low-frequency component data may be extracted by performing a binning operation on the input image data, and the high-frequency component data may be extracted by removing the low-frequency component data from the input image data.

In operation S13, the low-frequency component data may be color-converted using a color conversion matrix to generate first correction data. The color conversion matrix used in operation S13 may be the same as the color conversion matrix used in operation S30 of FIG. 3.

In operation S15, a data value of the high-frequency component data may be adjusted using the first correction data to generate second correction data. The first correction data obtained by color-converting the low-frequency component data may be used as a reference value for adjusting a data value of the high-frequency component data. For example, the second correction data may be generated by adjusting the data value of the high-frequency component data based on a ratio of a data value of the first correction data to a data value of the input image data.

In operation S17, the first correction data may be added to the second correction data to generate sum data. In operation S19, the sum data may be inversely color-converted using a color inverse conversion matrix. In an example embodiment, the color inverse conversion matrix may be an inverse matrix of the color conversion matrix. A detailed description of operations S11 to S19 is described below with reference to FIG. 6.

Figure 6:
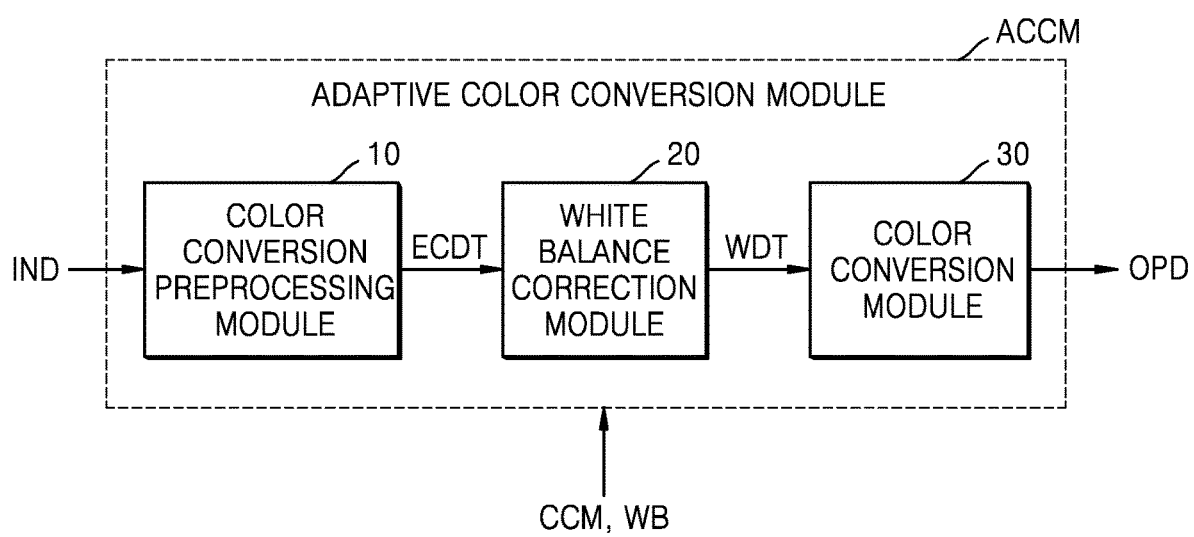
FIG. 6 is a block diagram illustrating an adaptive color conversion module according to an example embodiment.
Figure 7:
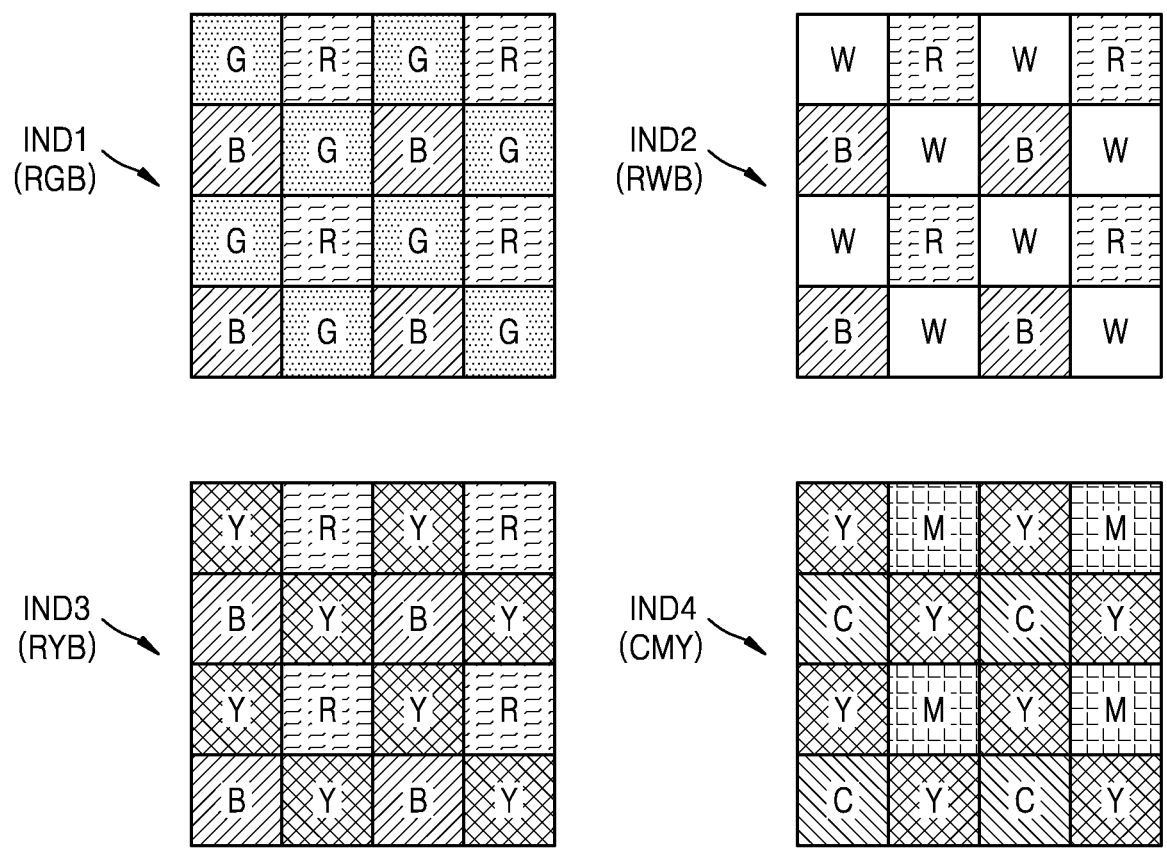
FIG. 7 is a diagram illustrating input image data according to an example embodiment.

FIG. 6 is a block diagram illustrating an adaptive color conversion module of an image processing apparatus according to an example embodiment. FIG. 7 is a diagram illustrating input image data of FIG. 6, and FIG. 8 is a diagram illustrating output image data of FIG. 6.

Figure 8:
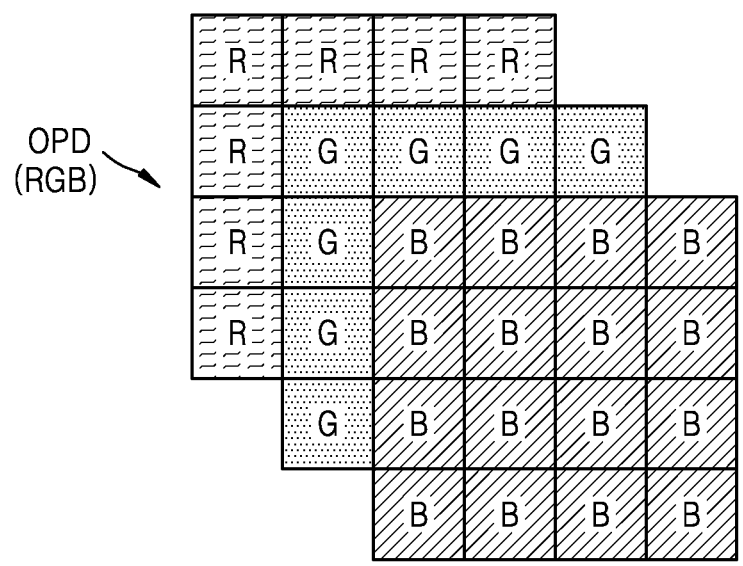
FIG. 8 is a diagram illustrating output image data according to an example embodiment.

Referring to FIGS. 6 to 8, the adaptive color conversion module ACCM may receive input image data IND and convert the received input image data IND into output image data OPD using a color conversion matrix CCM and a white balance matrix WB. The color conversion matrix CCM and the white balance matrix WB may be previously set, or matrix coefficients may vary according to a color space of the input image data IND and a color space of the output image data OPD. The adaptive color conversion module ACCM may include a color conversion preprocessing module 10, a white balance correction module 20, and a color conversion module 30.

Although FIG. 6 illustrates the adaptive color conversion module ACCM receiving the color conversion matrix CCM and the white balance matrix WB, example embodiments are not limited thereto. The adaptive color conversion module ACCM may receive spectral information having a structure of a color conversion function according to a wavelength of a color rather than the color conversion matrix CCM. For example, the adaptive color conversion module ACCM may perform a color conversion operation using the spectral information or extract the color conversion matrix CCM from the spectral information.

The input image data IND may include color information. The input image data IND may include, for example, first image data IND1, second image data IND2, third image data IND3 or fourth input image data IND4. The first to fourth input image data IND1 to IND4 include three different pieces of color information, respectively, for example, but example embodiments are not limited thereto. The input image data IND may include four different pieces of color information, and a configuration of the input image data IND may be variously modified. The color filter array CFA may be variously modified according to example embodiments in accordance with the input image data IND.

The first input image data IND1 may be RGB color data including red color information R, green color information G, and blue color information B. The first input image data IND1 may correspond to the Bayer pattern.

The second input image data IND2 may be RWB color data including red color information R, white color information W, and blue color information B. For example, the second input image data IND2 may correspond to a pattern in which a white color, instead of a green color, is disposed in the Bayer pattern, but is not limited thereto, and an arrangement pattern of the red color information R, the white color information W, and the blue color information B may be variously modified.

The third input image data IND3 may be RYB color data including red color information R, yellow color information Y, and blue color information B. For example, the third input image data IND3 may correspond to a pattern in which a yellow color, instead of a green color, is disposed in the Bayer pattern, but is not limited thereto, and an arrangement pattern of the red color information R, the yellow color information Y, and the blue color information B may be variously modified.

The fourth input image data IND4 may be CMY color data including cyan color information C, magenta color information M, and yellow color information Y. For example, the fourth input image data IND4 may have a color arrangement pattern of Y-M-C-Y in 2 by 2 color matrix.

The color conversion preprocessing module 10 may pre-process the input image data IND using the color conversion matrix CCM and output image data ECDT as a preprocessing result. A detailed configuration of the color conversion preprocessing module 10 is described below with reference to FIG. 9.

The white balance correction module 20 may perform white balance correction on the image data ECDT (i.e., first image data ECDT) using the white balance matrix WB. The white balance correction module 20 may output image data WDT (i.e., second image data WDT), as a white balance correction result, to the color conversion module 30. For example, when the input image data IND is the CMY color data (i.e., fourth input image data IND4), the corrected image data WDT may be calculated through Equation 1. {CI, MI, YI} may be data values corresponding to respective colors (cyan, magenta, and yellow) included in first image data ECDT, and {CO, MO, YO} may be data values corresponding to respective colors (cyan, magenta, and yellow) included in second image data WDT, which has been white balance-corrected. The white balance matrix WB may be defined as follows. Coefficients wb1, wb2, and wb3 of the white balance matrix WB may be preset values.

$$WB = \begin{bmatrix} wb_1 & 0 & 0 \\ 0 & wb_2 & 0 \\ 0 & 0 & wb_3 \end{bmatrix}$$ [Equation 1]

$$\begin{bmatrix} CO \\ MO \\ YO \end{bmatrix} = WB \cdot \begin{bmatrix} CI \\ MI \\ YI \end{bmatrix}$$

The color conversion module 30 may color-convert the white balance-corrected second image data WDT using the color conversion matrix CCM. The color conversion module 30 may demosaic the second image data WDT, perform a matrix operation with the color conversion matrix CCM, and subsequently provide output image data OPD. A detailed configuration of the color conversion module 30 is described below with reference to FIG. 10.

The output image data OPD may be full color image data in an RGB format and may include, for example, red color data, green color data, and blue color data. That is, each pixel may include a data value of a red color, a data value of a green color, and a data value of a blue color. However, this is an example, and the output image data OPD may be full color image data in a format other than the RGB format.

Figure 9:
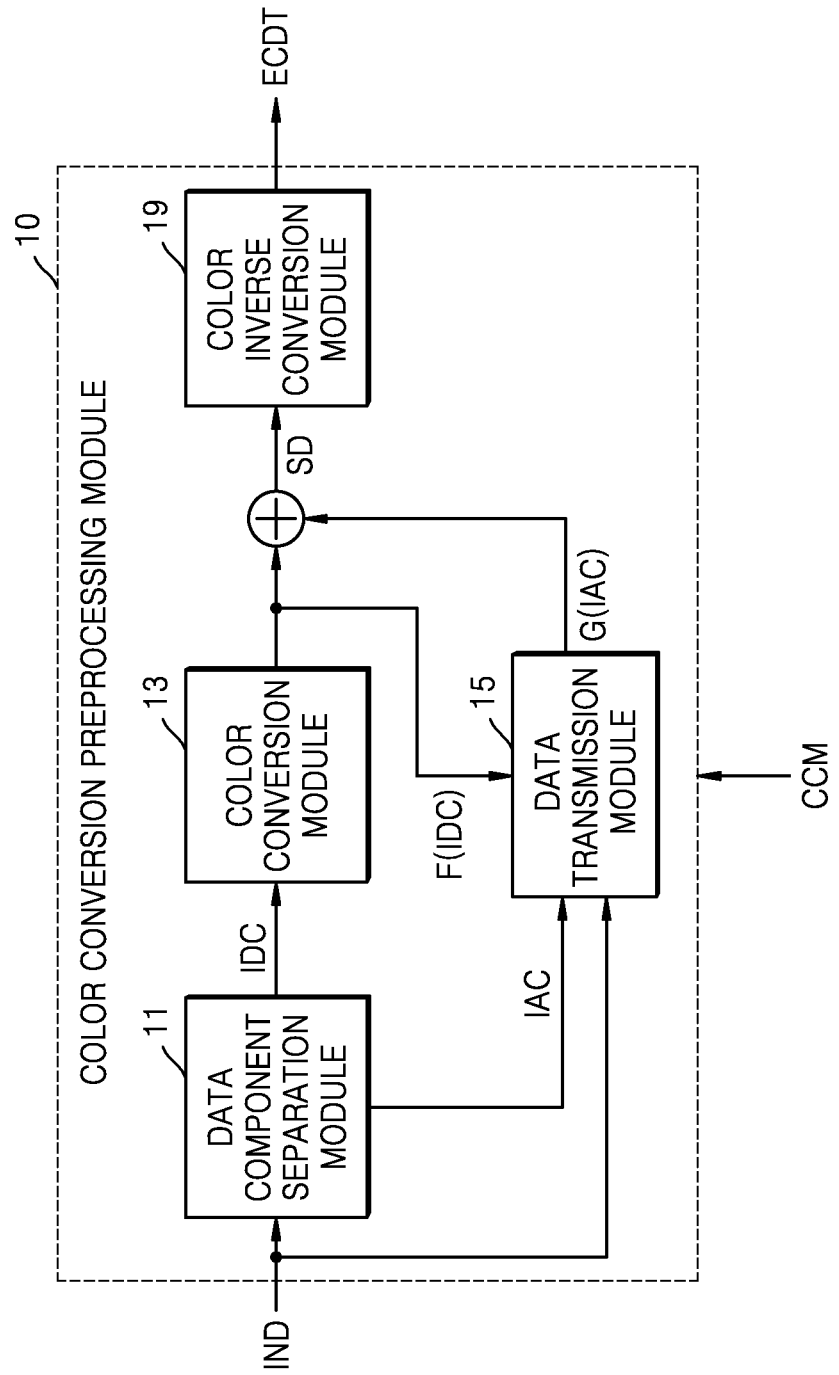
FIG. 9 is a block diagram illustrating a color conversion preprocessing module according to an example embodiment.

FIG. 9 is a block diagram illustrating an example of the color conversion preprocessing module 10 of FIG. 6.

Referring to FIG. 9, the color conversion preprocessing module 10 includes a data component separation module 11, a color conversion module 13, a data transmission module 15, a summing module 17, and a color inverse conversion module 19.

The data component separation module 11 may separate the input image data IND into high-frequency component data IAC and low-frequency component data IDC according to frequencies. The data component separation module 11 may generate the low-frequency component data IDC through a binning operation on the input image data IND. For example, the low-frequency component data IDC may be generated by performing a binning operation on a 4×4 pixel area in the input image data IND. The data component separation module 11 may generate the high-frequency component data IAC by excluding the low-frequency component data IDC from the input image data IND.

The color conversion module 13 may color-convert the low-frequency component data IDC using the color conversion matrix CCM to generate first correction data F(IDC). The color conversion module 13 may generate the first correction data F(IDC) by performing a matrix operation on the color conversion matrix CCM and the low-frequency component data IDC. An i-th data value $F_i(I_{DC})$ of the first correction data F(IDC) may be calculated through Equation 2 below. $I_{j,DC}$ is a j-th data value of the low-frequency component data IDC, and $CCM_{ij}$ is a coefficient of i×j of the color conversion matrix CCM.

$$F_i(I_{DC}) = \sum_{j=1}^{a} CCM_{ij} \cdot I_{j,DC}$$ [Equation 2]

Here, when three pieces of color information are included in the input image data IND, a value of a may be 3, and the color conversion matrix CCM may be a 3×3 matrix. For example, when the input image data IND includes cyan color information, magenta color information, and yellow color information, the value of a may be 3. Alternatively, when four types of color information are included in the input image data IND, for example, when cyan color information, magenta color information, yellow color information, and green color information are included in the input image data IND, the value of a may be 4.

The data transmission module 15 may receive the input image data IND, the high-frequency component data IAC, and the first correction data F(IDC), and generate second correction data G(IAC). The data transmission module 15 may adjust a data value of the low-frequency component data IDC according to a ratio of a data value of the first correction data F(IDC) to a data value of the input image data IND. For example, an i-th data value $G_i(I_{AC})$ of the second correction data G(IAC) may be calculated through Equation 3 below. $I_{i,AC}$ is an i-th data value of the low-frequency component data IDC, and $I_i$ is an i-th data value of the input image data IND.

$$G_i(I_{AC}) = \frac{F_i(I_{DC})}{I_i} \cdot I_{i,AC}$$ [Equation 3]

That is, the data transmission module 15 may adjust the data value of the low-frequency component data IDC to be proportional to the ratio of the data value of the first correction data F(IDC) to the data value of the input image data IND.

The summing module 17 may receive and add the first correction data F(IDC) and the second correction data G(IAC), and generate sum data SD. The color inverse conversion module 19 may perform color inverse conversion on the sum data SD using an inverse color conversion matrix, and generate the first image data ECDT as a preprocessing result. Here, the color inverse conversion matrix may be an inverse matrix $CCM^{-1}$) of the color conversion matrix CCD. An i-th data value $O_i$ of the first image data ECDT may be calculated through Equation 4 below.

$$O_i = CCM^{-1} \cdot \left( \sum_{j=1}^{3} CCM_{ij} \cdot I_{j,DC} + \frac{\sum_{j=1}^{3} CCM_{ij} \cdot I_{j,DC}}{I_i} \cdot I_{i,AC} \right) \quad \text{[Equation 4]}$$

The first image data ECDT may be data having the same color pattern as that of the input image data IND. For example, when the input image data IND is the CMY color data (i.e., fourth input image data IND4 of FIG. 7), the first image data ECDT, as a preprocessing result, may also be CMY color data and have the same color pattern as that of the fourth input image data IND4.

In the image processing apparatus according to example embodiments, color conversion preprocessing may be performed separately on the high-frequency component data IAC having a high possibility of noise boosting and the low-frequency component data IDC having a low possibility of noise boosting due to a color conversion operation on the input image data IND. A data value of the high-frequency component data IAC may be adjusted using the first correction data F(IDC), and a color inverse conversion matrix and an operation may be performed thereon in advance, so that noise boosting of the high-frequency component data IAC may be suppressed even if the high-frequency component data IAC is operated with the color conversion matrix CCM in a color conversion operation to be performed by the color conversion module (e.g., 30 of FIG. 6).

Figure 10:
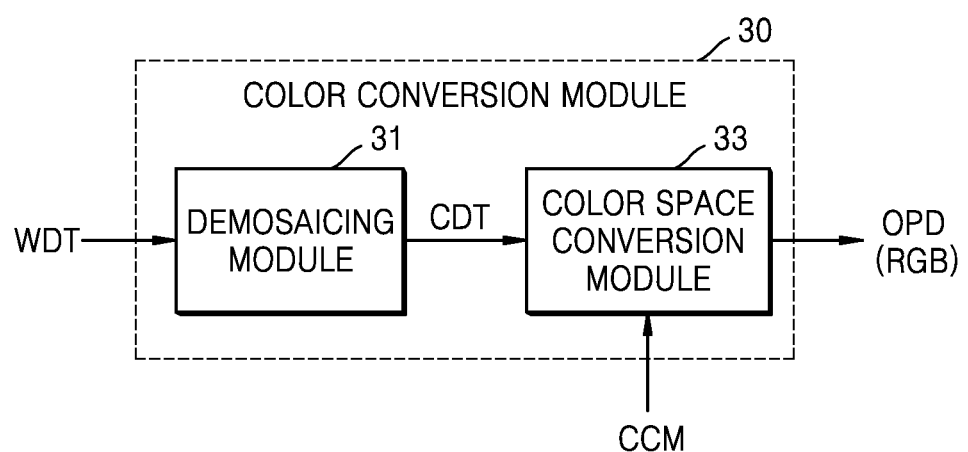
FIG. 10 is a block diagram illustrating a color conversion module according to an example embodiment.

FIG. 10 is a block diagram illustrating an example of the color conversion module 30 of FIG. 6.

Referring to FIGS. 6 and 10, the color conversion module 30 may include a demosaicing module 31 and a color space conversion module 33. The demosaicing module 31 may demosaic the second image data WDT. For example, when the input image data IND input to the adaptive color conversion module ACCM is the fourth input image data IND4 of FIG. 7, the second image data WDT may also be CMY color data and may have the same color pattern as that of the fourth input image data IND4.

The demosaicing module 31 may receive the second image data WDT and perform demosaicing thereon to generate full color image data CDT. For example, when the second image data WDT is CMY color data, the full color image data CDT may include cyan full color data, yellow full color data, and magenta full color data, and each pixel may include a cyan color data value, a yellow color data value, and a magenta color data value.

The color space conversion module 33 may receive the full color image data CDT and generate the output image data OPD. For example, the color space conversion module 33 may receive the full color image data CDT having a CMY color space and perform a color conversion operation on the full color image data CDT with the color conversion matrix CCM to convert the full color image data CDT into the output image data OPD (e.g., the OPD of FIG. 8) having an RGB color space. However, this is one example, and the color space of the full color image data CDT received by the color space conversion module 33 and the color space of the output image data OPD may be variously modified, and the color space of the full color image data CDT may be the same as or different from the color space of the output image data OPD.

Figure 11:
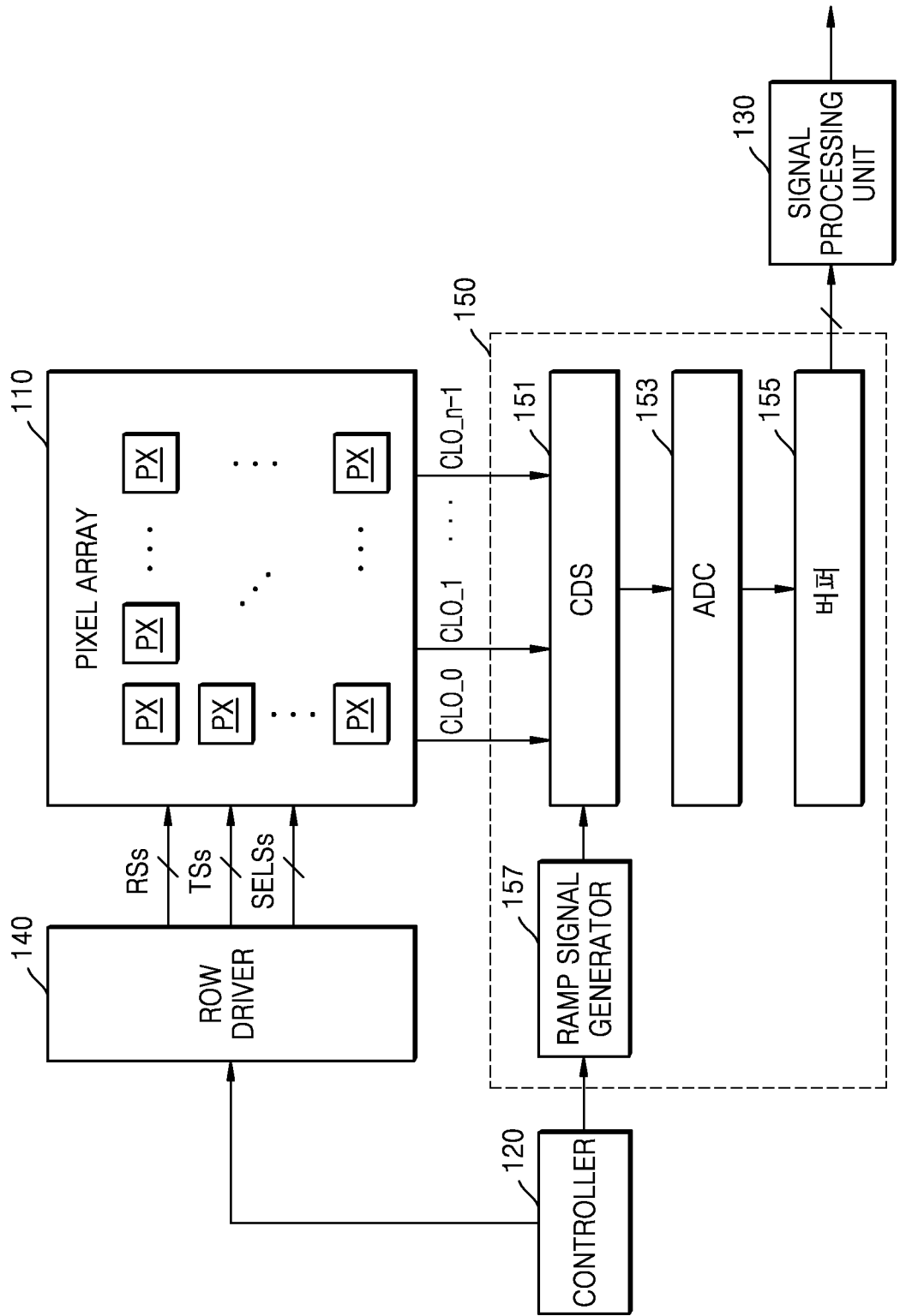
FIG. 11 is a block diagram illustrating a configuration of an image sensor according to an example embodiment.

FIG. 11 is a block diagram illustrating a configuration of the image sensor 100 or 100a of FIGS. 1A and 1B.

Referring to FIG. 11, the image sensor 100 may include a pixel array 110, a controller 120, a signal processing unit 130, a row driver 140, and a signal reading unit 150. The signal reading unit 150 may include a correlated-double sampling (CDS) 151, an analog-to-digital converter (ADC) 153, and a buffer 155.

The pixel array 110 may include a plurality of pixels PX configured to convert an optical signal into an electrical signal, and the plurality of pixels PX may be arranged two-dimensionally. The pixels PX may each generate pixel signals according to a detected intensity of light. Each pixel PX may be implemented as, for example, a photoelectric conversion device such as a charge-coupled device (CCD), a complementary metal oxide semiconductor (CMOS), or other type of photoelectric conversion device.

The pixel array 110 may include a color filter to filter various colors, and each of the pixels PX may sense a corresponding color. For example, the pixel array 110 may have a Bayer pattern, a tetra pattern (k=2), or a nona pattern (k=3) in which red color filters, green color filters, and blue color filters are arranged in a (k)×(k) matrix. Alternatively, for example, the pixel array 110 may include at least one of a white color filter, a yellow color filter, a cyan color filter, and a magenta color filter.

Each of the pixels PX may output a pixel signal to the CDS 151 through first to n-th column output lines CLO_0 to CLO_n−1 corresponding thereto. The CDS 151 may sample and hold the pixel signal provided from the pixel array 110. The CDS 151 may double-sample a level of certain noise and a level according to the pixel signal, and output a level corresponding to a difference therebetween. Also, the CDS 151 may receive ramp signals generated by a ramp signal generator 157, compare the received ramp signals with the pixel signals, and output a comparison result.

The ADC 153 may convert an analog signal corresponding to a level received from the CDS 151 into a digital signal. The buffer 155 may latch the digital signal, and a latch result may be sequentially output as image data to the outside of the signal processing unit 130 or the image sensor 100.

The controller 120 may control the pixel array 110 to accumulate charges based on incident light or temporarily store the accumulated charges, and control the row driver 140 to output an electrical signal based on the stored charges to the outside of the pixel array 110. Also, the controller 120 may control the signal reading unit 150 to measure a level of the pixel signal provided by the pixel array 110.

The row driver 140 may generate signals RSs, TSs, and SELSs for controlling the pixel array 110 and provide the generated signals to the pixels PX. The row driver 140 may determine a timing for activation and deactivation of reset control signals RSs, transmission control signals TSs, and the selection signals SELSs provided to the pixels PXs.

The signal processing unit 130 may perform signal processing based on pixel signals output from the pixels PX. For example, the signal processing unit 130 may perform noise reduction processing, gain adjustment, waveform shaping processing, interpolation processing, white balance processing, gamma processing, edge enhancement processing, and the like. In an example embodiment, the signal processing unit 130 may include the adaptive color conversion module ACCM of FIG. 1B.

Figure 12:
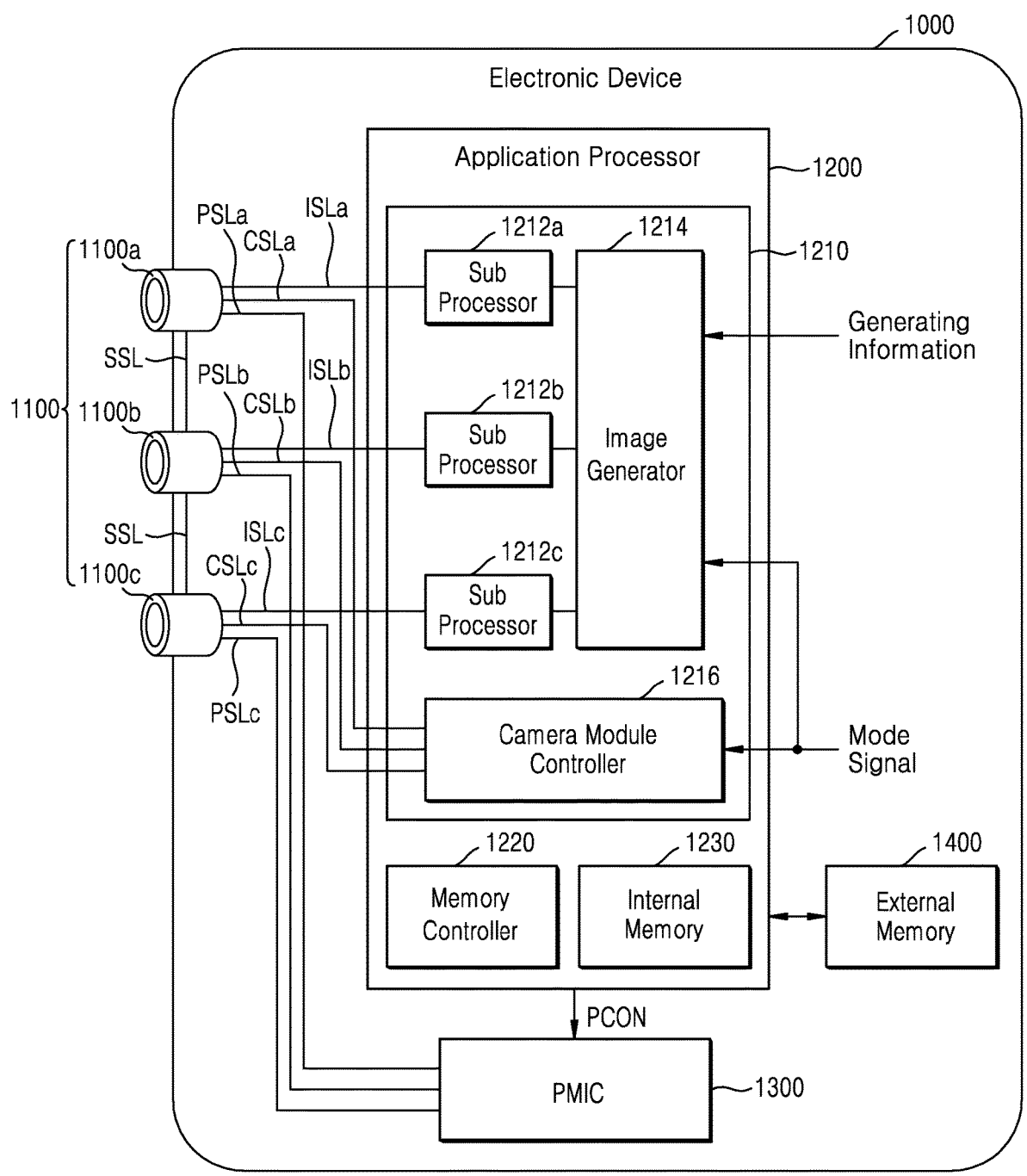
FIG. 12 is a block diagram of an electronic device according to an example embodiment.
Figure 13:
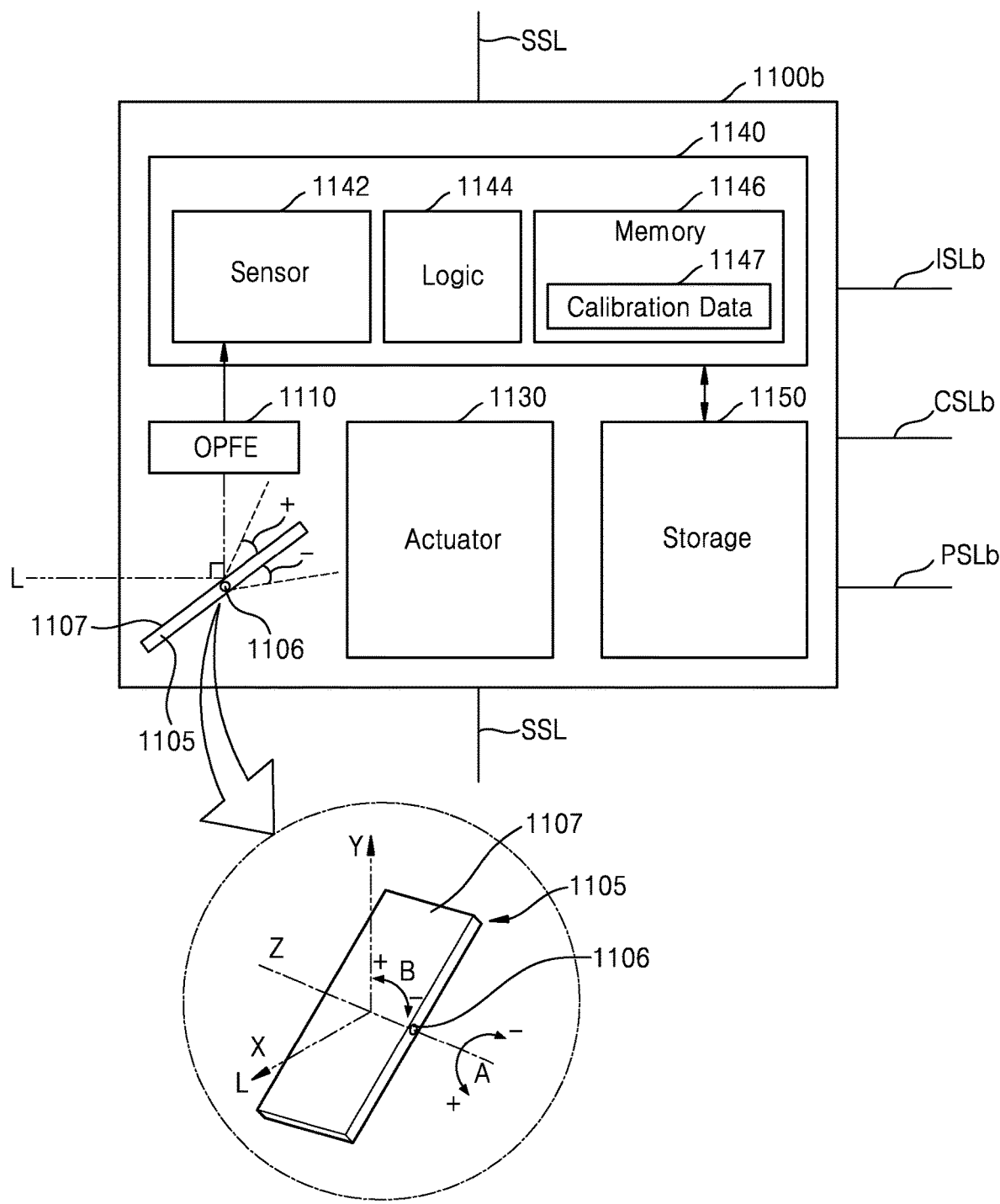
FIG. 13 is a detailed block diagram of a camera module according to an example embodiment.

FIG. 12 is a block diagram of an electronic device 1000 including a multi-camera module according to an example embodiment. FIG. 13 is a detailed block diagram of a camera module 1100*b* of FIG. 12 according to an example embodiment. Although FIG. 13 illustrates a detailed configuration of the camera module 1100*b*, the following description may be equally applied to the other camera modules 1100*a* and 1100*c* according to example embodiments.

Referring to FIG. 12, the electronic device 1000 may include a camera module group 1100, an application processor 1200, a power management integrated circuit (PMIC) 1300, and an external memory 1400. The camera module group 1100 may include the camera modules 1100*a*, 1100*b*, and 1100*c*. Although FIG. 12 illustrates three camera modules 1100*a*, 1100*b*, and 1100*c*, example embodiments are not limited thereto.

Referring to FIGS. 12 and 13, the camera module 1100*b* includes a prism 1105, an optical path folding element (OPFE) 1110, an actuator 1130, an image sensing device 1140, and a storage 1150.

The prism 1105 may include a reflective surface 1107, which includes a light reflective material, to modify a path of light L incident from the outside. The OPFE 1110 may include, for example, an optical lens including m (here, m is a natural number) number of groups. The actuator 1130 may move the OPFE 1110 or an optical lens (hereinafter, referred to as the optical lens) to a certain position.

The image sensing device 1140 may include an image sensor 1142, a control logic 1144, and a memory 1146. The image sensor 1142 may sense an image of a sensing target using the light L provided through the optical lens. In an example embodiment, the image sensor 1142 may be the image sensors 100 and 100*a* described above with reference to FIGS. 1A, 1B, and 11.

The control logic 1144 may control an overall operation of the camera module 1100*b*. For example, the control logic 1144 may control an operation of the camera module 1100*b* according to a control signal provided through a control signal line CSLb.

In an example embodiment, one camera module (e.g., 1100*b*), among the camera modules 1100*a*, 1100*b*, and 1100*c*, may be a folded lens-type camera module including the prism 1105 and the OPFE 1110 described above, and the other camera modules (e.g., 1100*a* and 1100*c*) may be a vertical-type camera module without the prism 1105 and the OPFE 1110, but example embodiments are not limited thereto.

In an example embodiment, one camera module (e.g., 1100*c*), among the camera modules 1100*a*, 1100*b*, and 1100*c*, may be a vertical-type depth camera configured to extract depth information using an infrared ray (IR). In this case, the application processor 1200 may merge an image data value provided from the depth camera with an image data value provided from another camera module (e.g., 1100*a* or 1100*b*) to generate a three-dimensional (3D) depth image.

In an example embodiment, at least two camera modules (e.g., 1100*a* and 1100*b*), among the camera modules 1100*a*, 1100*b*, and 1100*c*, may have different fields of view (viewing angles). In this case, for example, optical lenses of at least two camera modules (e.g., 1100*a* and 1100*b*), among the camera modules 1100*a*, 1100*b*, and 1100*c*, may be different from each other, but example embodiments are not limited thereto.

Also, in an example embodiment, viewing angles of the camera modules 1100*a*, 1100*b*, and 1100*c* may be different from each other. In this case, the optical lenses respectively included in the camera modules 1100*a*, 1100*b*, and 1100*c* may also be different, but example embodiments are not limited thereto.

In an example embodiment, the camera modules 1100*a*, 1100*b*, and 1100*c* may be physically separated from each other. That is, the camera modules 1100*a*, 1100*b*, and 1100*c* do not separately use divided sensing regions of the image sensor 1142, but the image sensor 1142, as an independent sensor, may be disposed in each of the camera modules 1100*a*, 1100*b*, and 1100*c*.

Referring back to FIG. 12, the application processor 1200 may include an image processing apparatus 1210, a memory controller 1220, and an internal memory 1230. The application processor 1200 may be implemented separately from the camera modules 1100*a*, 1100*b*, and 1100*c*. For example, the application processor 1200 and the camera modules 1100*a*, 1100*b*, and 1100*c* may be implemented separately as separate semiconductor chips.

The image processing apparatus 1210 may include a plurality of sub-image processors 1212*a*, 1212*b*, and 1212*c*, an image generator 1214, and a camera module controller 1216. In an example embodiment, the image processing apparatus 1210 may be the image processing apparatuses 200 and 200*a* of FIGS. 1A and 1B, and may perform the image processing operation described above with reference to FIGS. 2, 3, and 5. Also, the image processing apparatus 1210 may include the adaptive color conversion module ACCM described above with reference to FIGS. 1A, 1B, and 6.

The image processing apparatus 1210 may include the sub-image processors 1212*a*, 1212*b*, and 1212*c* corresponding to the number of camera modules 1100*a*, 1100*b*, and 1100*c*.

Image data values generated by the camera modules 1100*a*, 1100*b*, and 1100*c* may be provided to the corresponding sub-image processors 1212*a*, 1212*b*, and 1212*c* through image signal lines ISLa, ISLb, and ISLc separated from each other, respectively. For example, the image data value generated by the camera module 1100*a* may be provided to the sub-image processor 1212*a* through the image signal line ISLa, the image data value generated by the camera module 1100*b* may be provided to the sub-image processor 1212*b* through the image signal line ISLb, and the image data value generated by the camera module 1100*c* may be provided to the sub-image processor 1212*c* through the image signal line ISLc. The image data value may be transmitted using, for example, a camera serial interface (CSI) based on a mobile industry processor interface (MIPI), but example embodiments are not limited thereto.

The image data values respectively provided to the sub-image processors 1212*a*, 1212*b*, and 1212*c* may be provided to the image generator 1214. The image generator 1214 may generate an output image using image data provided from each of the sub-image processors 1212*a*, 1212*b*, and 1212*c* according to image generating information or a mode signal.

In an example embodiment, the image generator 1214 may generate an output image by merging at least some of the image data values generated by the camera modules 1100*a*, 1100*b*, and 1100*c* having different viewing angles according to the image generating information or the mode signal. In addition, the image generator 1214 may generate an output image by selecting any one of the image data values generated by the camera modules 1100*a*, 1100*b*, and 1100*c* having different viewing angles according to the image generating information or the mode signal.

The camera module controller 1216 may provide a control signal to each of the camera modules 1100a, 1100b, and 1100c. The control signal generated by the camera module controller 1216 may be provided to the corresponding camera modules 1100a, 1100b, and 1100c through control signal lines CSLa, CSLb, and CSLc separated from each other.

The application processor 1200 may store the received image data values, i.e., encoded data, in the internal memory 1230 provided therein or the external memory 1400 outside of the application processor 1200, and thereafter, the application processor 1200 may read the encoded data from the internal memory 1230 or the external memory 1400, decode the read data, and display an image generated based on a decoded image data value. For example, a corresponding sub-image processor, among the sub-image processors 1212a, 1212b, and 1212c of the image processing apparatus 1210, may perform decoding and may also perform image processing on the decoded image data value.

The PMIC 1300 may supply power, e.g., a source voltage, to each of the camera modules 1100a, 1100b, and 1100c. For example, the PMIC 1300 may supply first power to the camera module 1100a through a power signal line PSLa, supply second power to the camera module 1100b through a power signal line PSLb, and supply third power to the camera module 1100c through a power signal line PSLc, under the control of the application processor 1200.

While aspects of example embodiments have been particularly shown and described, it will be understood that various changes in form and details may be made therein without departing from the spirit and scope of the following claims.

What is claimed is:

1. An image processing method for converting a color space of input image data including color information, the image processing method comprising:
   preprocessing the input image data according to a frequency thereof to generate first image data;
   white-balance-correcting the first image data to generate second image data; and
   color-converting the second image data to generate output image data,
   wherein the color space of the input image data is different from a color space of the output image data.

2. The image processing method of claim 1, further comprising:
   generating high-frequency component data and low-frequency component data based on the input image data, wherein the color-converting is performed on the high-frequency component data to generate first image data; and
   color-converting the second image data to generate the output image data.

3. The image processing method of claim 2, further comprising:
   color-converting the low-frequency component data using a color conversion matrix to generate first correction data;
   adjusting a data value of the high-frequency component data using the first correction data to generate second correction data;
   summing the first correction data with the second correction data to generate sum data; and
   performing color inverse conversion on the sum data using a color inverse conversion matrix.

4. The image processing method of claim 3, wherein the adjusting the data value of the high-frequency component data is performed using a ratio of a data value of the first correction data to a data value of the input image data.

5. The image processing method of claim 3, wherein the color inverse conversion matrix comprises an inverse matrix of the color conversion matrix.

6. The image processing method of claim 2, wherein the generating the high-frequency component data and the low-frequency component data comprises extracting the low-frequency component data from the input image data and extracting the high-frequency component data by excluding the low-frequency component data from the input image data.

7. The image processing method of claim 2, further comprising demosaicing the second image data to generate full color image data,
   wherein the color-converting the second image data comprises converting a color space of the full color image data using a color conversion matrix to generate the output image data.

8. The image processing method of claim 1, wherein the input image data comprises red color information, white color information, and blue color information.

9. The image processing method of claim 1, wherein the input image data comprises red color information, yellow color information, and blue color information.

10. The image processing method of claim 1, wherein the input image data comprises cyan color information, magenta color information, and yellow color information.

11. The image processing method of claim 1, wherein the output image data comprises red color information, green color information, and blue color information.

12. An image processing method comprising:
    separating input image data into high-frequency component data and low-frequency component data, the input image data comprising color information;
    generating first correction data by color-converting the low-frequency component data using a color conversion matrix;
    generating second correction data by adjusting a data value of the high-frequency component data using the first correction data;
    summing the first correction data with the second correction data to generate sum data; and
    generating first image data by performing color inverse conversion on the sum data using a color inverse conversion matrix.

13. The image processing method of claim 12, wherein the generating the second correction data comprises multiplying a ratio of a data value of the first correction data to a data value of the input image data, by a data value of the high-frequency component data.

14. The image processing method of claim 12, wherein the first image data and the input image data comprise data of a common color space.

15. The image processing method of claim 12, further comprising:
    generating second image data by performing white balance correction on the first image data; and
    generating output image data by color-converting the second image data using the color conversion matrix.

16. The image processing method of claim 15, wherein a color space of the input image data is different from a color space of the output image data.

17. An image processing apparatus for converting input image data including color information, the image processing apparatus comprising:
    one or more memories storing instructions; and one or more processors configured to execute the instructions to control:
- a data component separation module to generate high-frequency component data and low-frequency component data based on the input image data;
- a first color conversion module to color-convert the low-frequency component data using a color conversion matrix to generate first correction data;
- a data transmission module to generate second correction data based on the input image data, the high-frequency component data, and the first correction data; and
- a color inverse conversion module to perform color inverse conversion on sum data obtained by summing the first correction data with the second correction data using an inverse matrix of the color conversion matrix, to generate first image data.

18. The image processing apparatus of claim 17, wherein the one or more processors are further configured to execute the instructions to control the data transmission module to generate the second correction data by adjusting a data value of the high-frequency component data using a ratio of a data value of the first correction data to a data value of the input image data.

19. The image processing apparatus of claim 17, wherein the one or more processors are further configured to execute the instructions to control:
- a white balance module to perform white balance correction on the first image data using a white balance matrix to generate second image data; and
- a second color conversion module to color-convert the second image data using the color conversion matrix to generate output image data.

20. The image processing apparatus of claim 19, wherein the one or more processors are further configured to execute the instructions to control the second color conversion module to:
- demosaic the second image data to generate full color image data; and
- convert a color space of the full color image data using the color conversion matrix to generate the output image data.

* * * * *